UNITED STATES PATENT OFFICE.

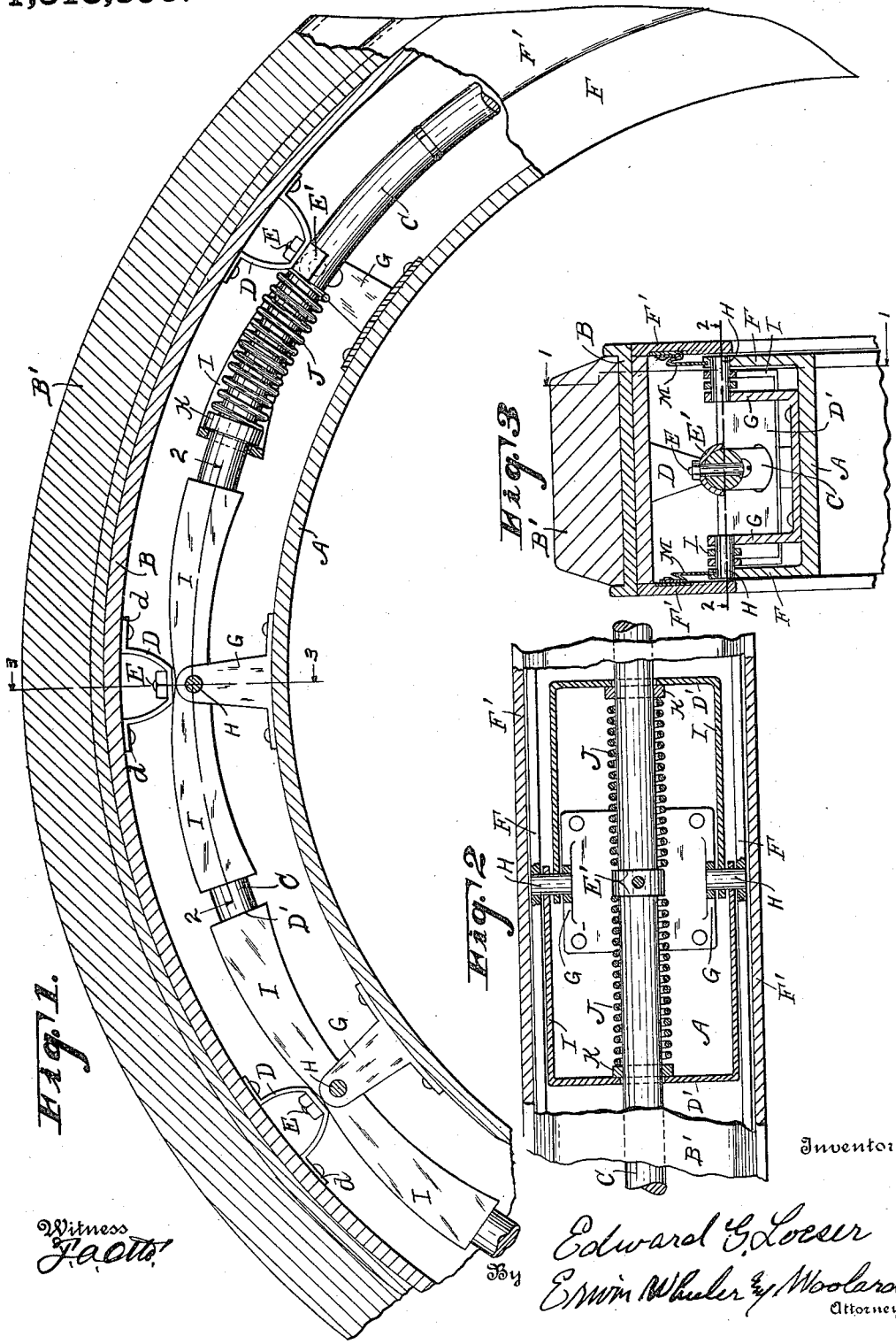

EDWARD G. LOESER, OF MILWAUKEE, WISCONSIN.

RESILIENT WHEEL.

1,318,393.  Specification of Letters Patent.  Patented Oct. 14, 1919.

Application filed February 13, 1919. Serial No. 276,715.

*To all whom it may concern:*

Be it known that I, EDWARD G. LOESER, a citizen of the United States, residing at Milwaukee, county of Milwaukee, and State of Wisconsin, have invented new and useful Improvements in Resilient Wheels, of which the following is a specification.

My invention relates to improvements in resilient wheels, with particular reference to that class of resilient wheels in which an outer tire carrying rim is supported resiliently from an inner felly or rim connected with the hub by spokes, or in any other suitable manner.

The object of my invention is to overcome the objections heretofore existing to the use of resilient wheels of this general type, by providing a form of structure in which lateral distortion will be prevented, or reduced to such a degree as to avoid destructive effects such as crystallization of springs, and in which there is adequate resistance to torsion as developed by traction in either a forward or backward movement of a vehicle propelling wheel, and in which the outer rim or tire carrying rim will be supported with the elasticity and stability necessary to an easy running, softly cushioned wheel, operating without noise or grating effects under all conditions of road travel.

To this end, I provide means whereby the outer or tire carrying rim may be connected with the inner rim or felly by a set of coiled springs coöperating with an intermediate ring, concentric with the felly, the springs being arranged to support the rod from a series of slings pivotally connected with radially projecting brackets mounted on the felly, and the outer or tire carrying rim being directly connected with and supported by the intermediate ring. The arrangement is such that the load will be carried by those springs which have substantially vertical axes, the pricipal function of the horizontally disposed springs at the top and bottom of the wheel being to resist torsional strains where the wheel is used as a traction wheel, and to also take up and distribute shocks such as tend to check the movement of the wheel along the line of travel. By coiling the springs around the intermediate ring, the latter being preferably circular in cross section, I relieve them from lateral strain and adequately hold the coils from displacement in any direction while allowing them to freely expand and contract along the lines of their own axes, substantially all pressures upon the springs being axial in direction, owing to the peculiar arrangement herein described.

In the drawings:—

Figure 1 is a fragmentary view of the rim portion of my improved wheel, showing the same partly in side elevation, and partly in section, drawn to a plane indicated by line 1—1 of Fig. 3.

Fig. 2 is a detail sectional view on line 2—2 of Fig. 3 and line 2—2 of Fig. 1.

Fig. 3 is a sectional view on line 3—3 of Fig. 1.

Like parts are identified by the same reference characters throughout the several views.

A is the felly or felly supported rim. It is not material whether this rim is supported from the hub by spokes, or in any other suitable manner, and therefore hub and rim supporting means are not illustrated.

B is the tire or tire receiving rim. In the construction shown, it is provided with a solid rubber tread portion B'. But the form, shape, or character of the tread portion is also not material to the invention herein disclosed.

But it will be observed that I have provided an intermediate ring C, which is preferably circular in cross section, and connected at intervals with the outer rim by brackets D. These brackets are preferably U-shaped with two points of connection by means of foot pieces *d* welded or riveted to the inner surface of the outer rim B, and centrally secured to the intermediate ring by bolts E.

The inner rim A has outwardly projecting side flanges F, preferably interlapping with marginal inwardly projecting flanges F' on the outer rim, one or both of which may be made detachable if the outer rim is unitary. In the construction shown, the outer rim is formed of two concentric bands. One of the flanges F' is integral with one band and the other flange is integral with the other.

These structural details are regarded as non-essential, but I utilize the outwardly projecting flanges F in coöperation with interior brackets G to support sets of alined hanger pins H, those of each set being disposed on opposite sides of the ring C, and utilized to pivotally support slings I, each of which has side arms pivoted to one of the hanger pins H, and a cross arm loosely engaging the rod C. The cross arm preferably has an aperture through which the rod C passes, and the slings are arranged in pairs of oppositely projecting slings, each pivotally hung from the same set of hanger pins.

Springs J coiled about the ring C within the respective slings are interposed, preferably under normal compression, between the bolts E, and the heads of the slings. If desired, seating members E' may serve as bearing members for the springs instead of having the springs bear directly against either the bolts or the brackets D. These seating members E' are preferably formed integrally with the brackets D as arcuate arms thereof.

A spring employed in the combination above described will operate quite differently from those which are allowed to deflect from their normal axis during compression or expansion. In my improved structure, the load is carried almost entirely by the vertically disposed springs in those slings which depend from their associated hanger pins H, and those springs in the dependent slings above and below them which are more nearly vertical than horizontal. The horizontally disposed springs carry substantially no load, but resist shocks and torsion strains. The most important fact to be considered however, is that in all cases, the movements of the springs in compressing and expanding are along their own axial lines, all other movements of the springs being bodily movements in which they travel with the ring C, and with the tire. Therefore, if the springs are adequate in strength to support the load and resist shocks without compression of the coils, into contact and interlapping relation to each other, i. e., adequate to support the load without exceeding the elastic limit, there will be no tendency toward crystallization.

In my improved structure, there is also no tendency for the outer or tire rim to shift laterally from the inner rim since the outer rim is held from side shifting not only by the flanges F, but more particularly by the slings, the latter being pivoted to the pins H at each side of the inner rim A, and having their head pieces in anchoring relation to the ring C, which, in turn, is rigidly secured to the outer rim B. This support of the ring C and tire from the yokes may be strengthened by reinforcing collars K, which also serve as spring seatings at the outer ends of the springs, the ends which bear upon the brackets D being regarded as the inner ends of the paired springs.

To facilitate assembly, the ring C may be split transversely at one point until the springs and slings have been assembled thereon, after which its ends may be welded and the ring secured to the rim B, or to one section thereof. The yokes may then be connected with the inner rim A by inserting the cross pins, and the remaining section or flange of the outer rim may then be attached. Flexible dust excluding jackets M are preferably applied to the inner faces of the flanges F and F', and secured thereto in any convenient manner after adjusting the margins of the jackets so as to provide sufficient slack to allow the rims to move toward and from each other without imposing excessive strains upon the jackets.

I claim:—

1. A resilient wheel comprising the combination of spaced concentric inner and outer rims, an interposed ring secured to the outer rim, pairs of oppositely disposed slings each pivotally secured to the inner rim at one end, and arranged with swinging ends loosely engaging the ring at its other end, and springs coiled about the ring within the slings, and adapted to support the ring and outer rim from the swinging ends of the slings.

2. A resilient wheel having inner and outer concentric rims, in combination with a series of pairs of oppositely disposed slings, respectively provided with spaced side arms having transverse pivotal connection with one of the rims, and adapted to swing in a plane which includes the rims, and resilient devices mounted in said slings, and supporting the other rim from the one to which the slings are pivotally connected.

3. A resilient wheel having outer and inner concentric rims, in combination with an intermediate ring connected with one of the rims, a set of slings pivotally connected with the other rim, and arranged in pairs of slings projecting in opposite directions from their points of pivotal connection, and loosely connected with the intermediate ring, and means for resiliently supporting the ring from each of the slings, each of said slings being arranged to swing upon its pivotal connection in a plane parallel to the central plane of the wheel.

4. A resilient wheel having outer and inner concentric rims, in combination with an intermediate ring connected with one of the rims, a set of slings pivotally connected with the other rim, and arranged in pairs of slings projecting in opposite directions from their points of pivotal connection, and loosely connected with the intermediate ring, each sling adapted to swing upon its pivotal connection in the central plane of the wheel, means for resiliently supporting the ring from each of the slings, said resilient means comprising coiled springs, each interposed between the swinging end of the sling, and a seating carried by the ring, said ring having the seatings for the springs at the connecting points between it and the rim to which it is attached.

In testimony whereof I affix my signature in the presence of two witnesses.

EDWARD G. LOESER.

Witnesses:
O. C. WEBER,
LEVERETT C. WHEELER.

Copies of this patent may be obtained for five cents each, by addressing the "Commissioner of Patents, Washington, D. C."